United States Patent
Farley

Patent Number: 5,300,224
Date of Patent: Apr. 5, 1994

[54] FLUID TREATMENT DEVICE

[76] Inventor: Frederick A. Farley, 2363 Blackfoot, Placentia, Calif. 92670

[21] Appl. No.: 796,433

[22] Filed: Nov. 21, 1991

[51] Int. Cl.$^5$ .............................................. B01D 24/14
[52] U.S. Cl. .................................... 210/266; 210/282; 210/286; 210/289; 210/449
[58] Field of Search ............... 210/266, 282, 287, 289, 210/291, 449, 286

[56] References Cited

U.S. PATENT DOCUMENTS

| | | | |
|---|---|---|---|
| 1,914,829 | 6/1933 | Imhoff et al. | 210/291 |
| 3,245,540 | 4/1966 | Johnson | 210/291 |
| 4,213,600 | 7/1980 | Thompson | 210/266 |
| 4,642,192 | 2/1987 | Heskett | 210/903 |
| 5,008,011 | 4/1991 | Underwood | 210/449 |

Primary Examiner—Ivars Cintins
Attorney, Agent, or Firm—James G. O'Neill

[57] ABSTRACT

The present invention provides a one piece or unitary filter assembly for attachment to a waterline to remove chlorine and other substances from water. This unitary assembly provides a rechargeable or reusable filter assembly for use with hot water passing through a concentrated bed of 100% granulated or powdered zinc and includes a removable diverter/screen element to enable zinc to be added to or removed from an internal chamber formed therein. The preferred method of treating water utilizes 100% zinc filter media to react with or remove chlorine and other substances more efficiently from water, thereby allowing a greater volume of water to be treated, as well as the treatment of water at elevated temperatures. The pure zinc filtering media used has the added advantage of achieving a more efficient oxidation of chlorine while meeting current EPA standards.

11 Claims, 1 Drawing Sheet

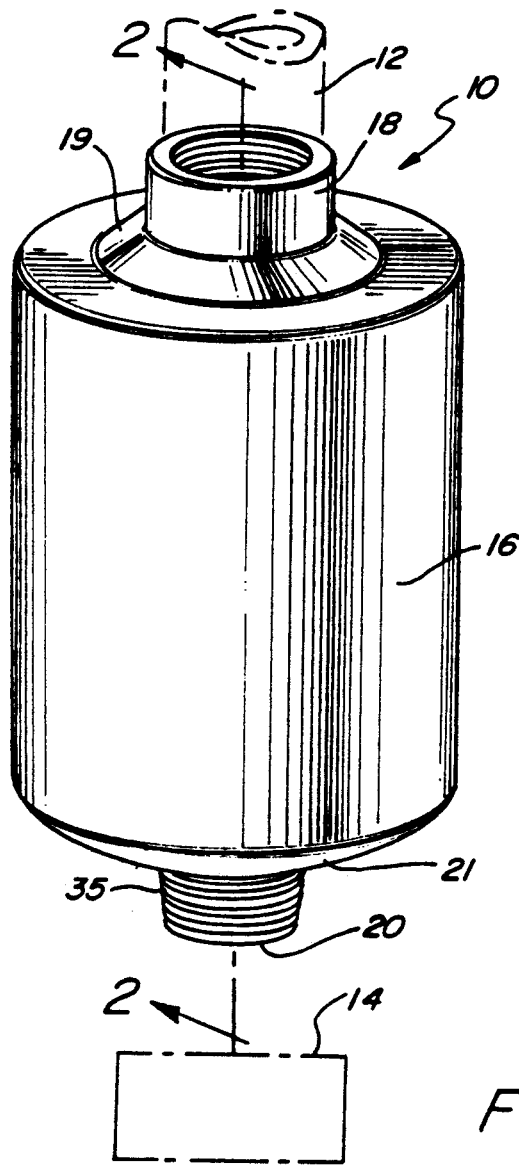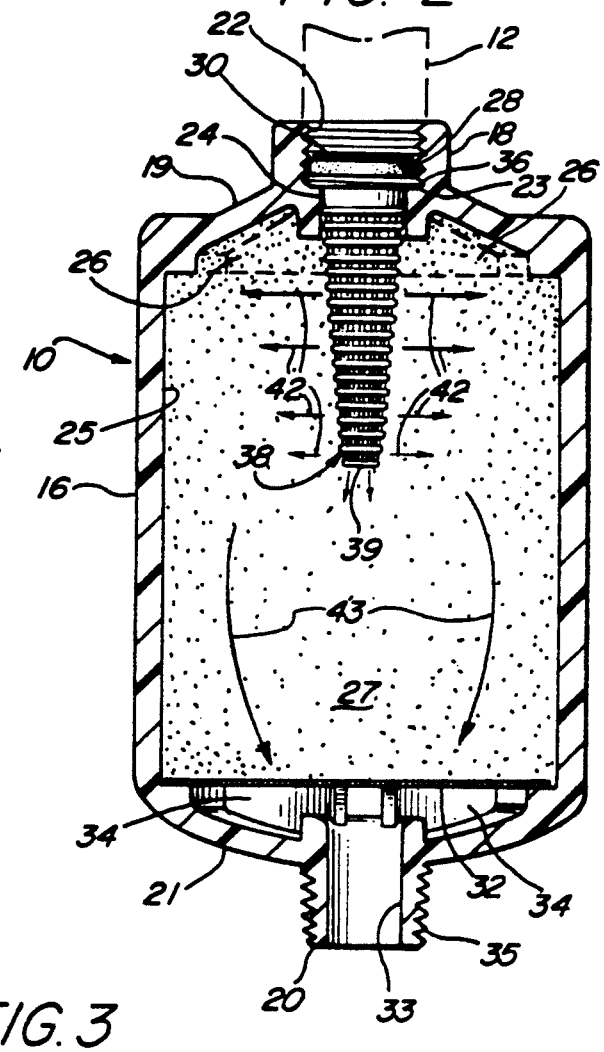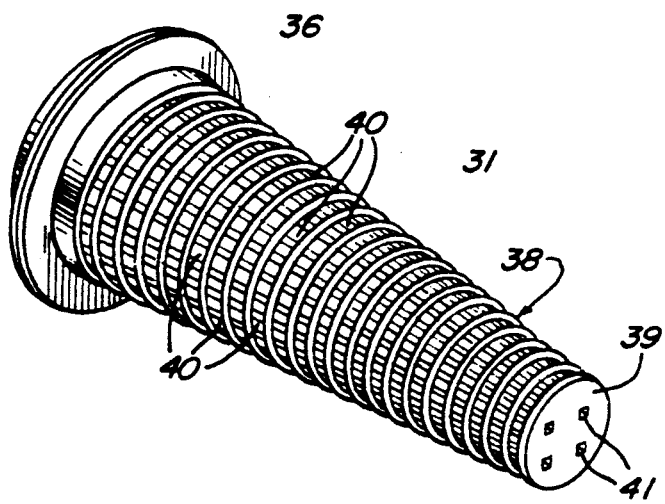

FLUID TREATMENT DEVICE

CROSS REFERENCE TO RELATED APPLICATIONS

This application discloses apparatus described and claimed in the following related application: copending application entitled SHOWER FILTER ASSEMBLY, Ser. No. 07/714,195, filed Jun. 12, 1991, in the name of Frederick A. Farley, applicant herein, now U.S. Pat. No. 5,152,464.

BACKGROUND OF THE INVENTION

1. Field of the Invention

This invention relates generally to treatment of fluids and more particularly to a device and method for the removal of unwanted materials, such as chlorine, from water.

2. Description of Related Art

Starting after the U.S. Civil War, the recognition and linking of macroscopic and microscopic pathogens to the aesthetic and health qualities of water resulted in the search for effective water disinfection and treatment procedures. Soon thereafter, chlorine was identified as a disinfecting agent. Towards the end of the 19th century, there were several recorded instances of the use of chlorine compounds for the disinfection of water and, with increasing experience, the effectiveness of chlorine treatment of water became more widely recognized and appreciated. The introduction of water chlorination, as a continuous process, occurred soon after the turn of the century. Currently, approximately 80% of all potable water systems in the U.S. contain chlorine as a disinfectant.

It is now known that chlorine passes across cell membranes and chemically bonds to amino acids, creating more complex chloro-compounds, disabling cellular protein synthesis, which in turn effectively destroys a micro-organism.

However, the treatment of water with chlorine is not without its drawbacks. Even in lower concentrations, such as originally used by commercial food processors and bottlers, chlorine creates an objectionable odor and taste. Also, as chlorine is added to water containing pathogenic microorganisms, the highly reactive chlorine combines with fatty acids and carbon fragments to form a variety of toxic compounds.

During the mid 1970's, monitoring efforts began to identify widespread toxic contamination of the water supplies in many parts of the world. In fact, epidemiological studies at the same time began to suggest a link between the ingestion of toxic chemicals in the water and elevated cancer mortality risks, as well as other diseases, such as arteriosclerosis, heart disease, anemia, high blood pressure, allergic reactions, and adverse conditions related to the drying and damaging of hair and skin.

Additional studies since the 70's indicate that chlorine and the compounds it forms in water can also be inhaled and absorbed through the skin by persons during bathing or showering. In fact, according to research presented at a meeting of the American Chemical Society in the 1980's, it was shown that "taking long hot showers is a health risk." In summary, this presentation stated that "taking showers, and to a lesser extent baths, lead to a greater exposure to toxic chemicals contained in water than does drinking the water. Due to the increased temperatures and surface area, the chemicals evaporate out of the hot water and are inhaled. They can also spread through the house and be inhaled by others. Householders can receive 6 to 100 times more of the chemicals by breathing the air around showers and baths than they would by drinking the water."

Different devices and methods for dechlorination of water have been used both at the point-of-entry ("POE") into a commercial, industrial or residential building, and the point-of-use ("POU") at the faucet, shower head or tap.

POE systems typically are in the form of an aerator, or a large organic or inorganic filtering media bed. Although applicable in some instances, these systems have potential problems, and have fallen under close scrutiny, due to the possibility of pathogenic reintroduction back into the water system, after the point of dechlorination. Because of this possibility, and the recent advancement in water treatment technology, POU water treatment systems have become widely accepted and are now primarily used in residential, and to a large degree, in commercial and industrial applications.

Both organic and inorganic filtering media are known for use in dechlorination. Carbon (organic) filtering media are used either alone, or in conjunction with other systems, such as reverse osmosis or distillation, or may be used with inorganic filtering media, such as cation/anion resins.

Carbon filtration comes about through the process of adsorption, which is dependent upon finite attachment sites located on the carbon filtering media, resulting in:

1.) A low volume capacity, typically measured or rated in (X) 100 gallons; and

2.) High temperature intolerance; a decrease in filtering efficiency as temperature increases up to a point where the filtration ceases and a releasing of filtered contamininates occurs (off-loading) back into the water, thereby producing a more contaminated water than if left unfiltered.

Some inorganic filtering media, such as cation/anion resins, have shortcomings similar to those of carbon, in that they have a very low volume capacity and become ineffective at higher temperatures.

Other known inorganic medias use a oxidation-reduction treatment method of the "electronegative cell potential type", based on the Voltaic or Galvanic cell, utilizing electrochemical principals. They are of a type that produce electricity as a result of spontaneous chemical change due to the electronegative potential created by the dissimilar metals used. This type of cell was first used by Alessandro Volta (1745-1827). He was able to generate electric current by stacking pieces of copper and zinc in salted water. The combination of copper and zinc, therefore, recreates the classic model of a chemically reactive cell, with the zinc and copper acting as electrodes. As the water passes through the "cell" the substances suspended in the water have a tendency to either be reduced or oxidized, thereby resulting in the molecular transformation of the substances. By using this type of method, distinct advantages exist. As the filtering media is typically metallic it possesses both a high volume capacity, measured or rated by (X) 1000 gallons, and a high temperature/high efficiency capacity.

One such prior art filter media is disclosed in U.S. Pat. No. 4,642,192, which discloses an "electronegative cell potential type" chlorine filter media, of the type discussed immediately above. The preferred media to filter out chlorine disclosed in this patent is brass (a mixture of copper and zinc). Although this patent mentions the use of zinc to remove chlorine, it points out in column 5, lines 17 through 23 thereof that although zinc is theoretically more spontaneous than copper, because it has a more positive potential, in actual practice it had been found that a zinc and copper alloy, such as brass, is more effective in the removal of dissolved chlorine than is either pure zinc or pure copper or a heterogeneous mixture thereof. Additionally, in lines 24 through 28 of this same column 5, it is recited that brass is also preferred from the viewpoint of chemical safety since it does not have the violent reactivity to aqueous fluids as do metals such as pure sodium, potassium, calcium and zinc. However, applicant's recent studies have demonstrated that the use of zinc alone, produces better results than a cooper/zinc mixture, thus coinciding with traditional inorganic chemistry theories. Also, since zinc is a transition element (copper is not) and not in the same chemical family, it does not have similar chemical properties, including reactivity, as does sodium, potassium (alkali metal elements) and calcium (alkaline earth metal element). It is a well known fact that zinc has an OSHA/MSDS and NFPD reactivity rating of #1. This is defined as: "Materials which in themselves are normally stable, but which can become unstable at elevated temperatures and pressures, or which may react with water with some release of energy, but not violently." In contrast to zinc, sodium, potassium and calcium are all given a reactivity rating of #2. This is defined as: "Materials which in themselves are normally unstable and readily undergo violent chemical change, but do not detonate. Also materials which may react violently with water or which may form potentially explosive mixtures with water. Additionally, this patent fails to take into account recent government studies and regulations, such as those from the Environmental Protection Agency (IIEPAII), which has set the maximum contaminant levels for copper in potable water as 5 times more stringent than for zinc. That is, copper's limit is one part per million (PPM), while zinc is much more tolerated, at 5 PPM.

The following disadvantages also exist with "electronegative cell potential type" filter medias:

1. The classic models either use acids as the fluid medium to activate the reaction, or when using a non-acidic fluid medium, electricity is driven across the cell.

If neither of these is used, the reaction in the cell is dependent on the relatively weak electrical potentials created by the difference of the standard reduction potentials (E°values at 25 degrees C.) of each of the dissimilar materials used (as is the case for the "electronegative cell potential types").

In this connection, the disclosure in U.S. Pat. No. 4,642,192, starting at line 57 of column 4 and ending at line 28 in column 5 is incorporated herein, in its entirety, by this reference thereto. Therefore, for example, the difference in the reduction potentials between copper and zinc would be 1.10 volts, arrived at as follows:

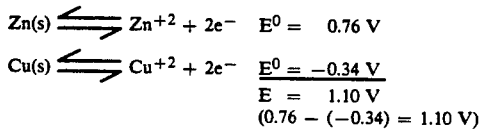

When using this method to oxidize chlorine, zinc will react more spontaneously than the copper. The copper will actually impede the reaction between zinc and chlorine, acting as an electronic buffer between the zinc and the chlorine, as follows:

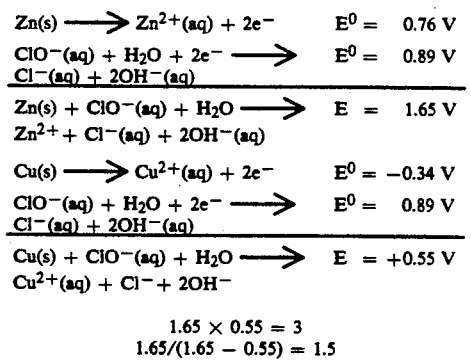

$$1.65 \times 0.55 = 3$$
$$1.65/(1.65 - 0.55) = 1.5$$

Therefore, as shown, when 100% zinc combines with chlorine the reaction will be 3 times more spontaneous than a reaction of 100% copper with chlorine, and 1.5 times as spontaneous as the combination of a 50/50 mixture of copper and zinc with chlorine.

2. The "electronegative cell potential types" that use copper are further at risk of introducing copper into water, and exceeding the above EPA regulations for copper content in potable water.

Other prior art devices to remove chlorine from water supplies are known. These devices generally include filtering means for attachment in or to a waterline in a commercial, industrial, or residential setting, or to replace a faucet or shower head therein. By-pass means may be added to such devices, and valves may be switched or changed if it is desired to allow unfiltered water to exit from or travel around the filter means. In addition, as discussed above, different methods are used, and differing filtering media are held in these known devices to selectively remove, specific unwanted particles or materials from the water passing therethrough.

One type of filtering device now available for removing chlorine from water is disclosed in applicant's co-pending application, referred to above. The device disclosed therein is a compact filter assembly having a recessed inlet connected to the end of a waterline in a shower. The assembly contains a filtering media to filter out unwanted chlorine in the water passing through the filter and an adjacent internal baffle means to direct the flow of water more evenly through the filtering media. This filter assembly also includes internal placement and reinforcing means to properly locate the internal baffle means and to strengthen the two parts of the filter housing. A water shut-off means and a compact shower head may also be added after the filter media, and does not greatly increase the size of this compact filter means.

U.S. Pat. No. 2,582,388, discloses another prior art water filter, for insertion into a waterline, having two parts threaded together to form a shell or housing, having a plurality of screens held in an inlet to and outlet from the interior thereof. Layers of activated charcoal, separated by a layer of silica and screens are arranged in the shell to filter water passing through the shell.

U.S. Pat. No. 3,760,951, incorporates U.S. Pat. No. 2,582,388 therein by reference, and discloses a similar water filter for insertion into a waterline by means of quick-disconnect bayonet fittings that allow the filter to be easily removed for cleaning or replacement.

U.S. Pat. No. 3,780,869, discloses a water filter, for insertion into a waterline, having a plurality of compartments with multiple filtering elements of sheep's wool therein. The filter includes two separate body parts which are held together by threaded portions that allow the body to be taken apart and put back together to replace or clean the multiple filter elements contained therein. The filter also includes a valve for shifting between filter and non-filter positions.

U.S. Pat. No. 3,822,018, discloses a water filter, for insertion into a waterline, having two hemispherical sections joined together by threaded portions. The filter has a plurality of cylindrical filter elements annularly arranged therein containing natural wool, charcoal, cork and the like, and includes a valve for directing water through the filter elements or for directing water through the device, unfiltered.

U.S. Pat. No. 4,107,046, discloses a filter cartridge for an internally by-passable water purifier apparatus. The apparatus includes valve means for directing water through the filter cartridge, which contains granulated carbon mixed with a silver zeolite, and may be sandwiched between fibrous sheets of material, such as felt, before it exits the apparatus, and another valve means for directing water to the outlet of the apparatus along a path that by-passes the filter cartridge.

U.S. Pat. No. 4,172,796, discloses a water faucet having a water purification or filtering means, made from activated carbon, or carbon with oligodynamic silver, formed therein. Valve means are provided for selecting the flow of water therethrough to either discharge filtered or unfiltered water.

U.S. Pat. No. 4,504,389, discloses a water faucet having a separate housing containing a removable cartridge or filter element made from various stages of polyethylene and activated carbon particles therein, and valve means for selecting whether the faucet provides filtered or unfiltered water. The filter cartridge is replaceable by removing a cap covering the separate housing holding the cartridge, lifting out the old cartridge, and inserting a new cartridge.

U.S. Pat. No. 5,008,011, discloses a shower dechlorinator fabricated in the form of a short cylindrical filter housing having two separate end caps with inlet and outlet means for attachment between the outlet pipe for a shower and a shower head. The filter housing is filled with granulated or randomly oriented fibrous material in the form of a copper/zinc metal alloy. This patent is limited in its disclosure to the specific shape of the filter housing and the copper/zinc metal alloy filter media described therein. The shape and size of the filter housing is akin to that of a so-called "pipe bomb", and the copper/zinc metal alloy is similar, if not identical, to that disclosed in U.S. Pat. No. 4,642,192 discussed above, and suffers from the same problems discussed in connection with this patent.

While the foregoing prior art devices, filter media and methods provide improved filtration of water passing through them, they are not adapted to meet the health and safety standards of today, nor do they meet the requirements, such as in baths or showers, that larger volumes of heated water having increased amounts of unwanted chlorine therein be safely filtered out. Furthermore, while the above-mentioned prior art provide some limited improvements in the filtering art, there remains the need in the art for a filter assembly that provides maximum strength, as well as the most efficient method of filtering out unwanted materials, such as chlorine, while at the same time meeting the more stringent health and safety regulations of local communities and such governmental agencies as the EPA.

SUMMARY OF THE INVENTION

Accordingly, it is a general object of the present invention to provide an improved method for filtering fluids. It is a particular object of the present invention to provide an improved method for filtering chlorine from water. It is a still more particular object of the present invention to provide an improved device for filtering chlorine from water. It is yet a more particular object of the present invention to provide an improved water filter that includes 100% zinc as the filtering media therein. It is a further object of the present invention to provide a method and filter that meets the demanding filtering capacity and temperature requirements of modern water supplies having higher concentrations of toxins therein, and at the same time meeting the more exacting governmental requirements for use with potable water, and the environmental concerns of less waste of materials and energy by reusing the same housing over and over again.

In accordance with one aspect of the present invention, there is provided a one piece or unitary filter housing for attachment to a pipeline to treat a fluid, such as water. This assembly provides a rechargeable and/or reusable filter housing for use to treat hot fluids/water passing through a concentrated bed of 100% granulated or powdered zinc contained therein. Furthermore, the unitary housing of the present invention uses a novel removable screen element to enable zinc filter media to be quickly and easily added to or removed therefrom. The preferred method disclosed herein uses only powdered or granulated zinc as the filtering media to more efficiently remove chlorine and other substances from fluids, such as water. Additionally, the method allows a greater volume of water at higher temperatures to be treated than known organic filters. Furthermore, the substantially pure zinc filter media used in the present invention has the added advantage of achieving a more efficient oxidation of chlorine and other substances than known filters and/or filtering media, without introducing any contaminants to the treated fluids, as related to other filter medias.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a perspective view of the preferred embodiment of the filter assembly of the present invention;

FIG. 2 is a sectional view taken along the line of FIG. 1, looking in the direction of the arrows, showing the internal construction thereof; and FIG. 3 is a perspective view of the novel diverter/screen element removably held in the filter.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an explanation of a novel filter assembly for use in filtering toxic substances, such as chlorine, from fluids, such as water, and a method for more efficiently removing chlorine from water, and particularly hot water passing to a bathtub or shower head.

Turning now to the drawings, there shown is a filter assembly 10, which may be fixed in or to the end of a fluid pipeline or shower arm 12, shown in broken line. If desired, a device, faucet, shower head, or the like 14, also shown in broken line, may be fixed to the outlet end of the filter assembly, as explained below. It will be readily apparent to those skilled in the art that a one piece or unitary outside body or shell 16 of the filter assembly 10 may be constructed in any conventional or known manner from any acceptable material, such as high strength plastic or the like. In this manner, it can be seen that the one piece outside shell 16 will form the substantially unitary filter assembly 10, capable of containing high pressure fluids as well as chemical reactions with chlorine or other substances and any acceptable filter media, such as 100% zinc, therein.

As stated above, the outside body or shell 16 of unitary assembly 10 is a one piece body or housing. This body 16 is preferably cylindrical, having at one end an inlet 18 formed integrally with and centrally located on an integrally formed substantially dome shaped, circular end wall 19. An outlet 20 is formed integrally with and centrally located on a second dome shaped, circular end wall 21, which is also formed integrally with the cylindrical body 16. An internally threaded passage 22 extends through the inlet 18 to a shoulder 23 and a reduced diameter or smaller inlet passage 24 fluidly connected to a hollow inner chamber 25 bounded by the inner surfaces of the body 16, including the end walls 19, 21. A plurality of vanes or stiffening members 26 are provided on the inner surface of end wall 19, adjacent the smaller inlet passage 24, for added strength and to funnel or guide fluid entering from inlet 24 into chamber 25 through a filtering media 27 within the chamber, as described more fully below. The internal threads of passage 22 may be secured to an externally threaded end (not shown) of the pipeline or shower arm 12, with a sealing means 28 held between the threaded end of 12, a filter screen 30, a lip 36 of a diverter/screen means 31 (explained more fully below), and shoulder 23.

The outlet 20 extends outwardly or away from the outer surface of domed end wall 21, and includes an internal passage 33 fluidly connected to internal chamber 25 to allow filtered or dechlorinated fluid to exit from the chamber. Before exiting, the dechlorinated fluid first flows through the filter media 27, then through an outlet screen 32 and is then guided by a plurality of vanes or stiffening members 34, similar to vanes 26, formed on the inner surface of end wall 21, to the outlet passage 33. In addition to acting in the same manner as vanes 26, the vanes 34 also serve as a seat against which the outlet screen 32 is held, in any desired or known manner, so as to keep the screen 32 in the preferred position. The dechlorinated fluid exiting through outlet passage 33 may then be used in the device, or pass through the faucet or shower head 14, secured to a threaded end 35 formed externally on outlet 20.

The diverter/screen means 31 is preferably frustro-conical in shape, and is removably held within the inlet 18 by an enlarged annular head or lip 36, integrally formed with or fixed at one end thereof and threadedly captured in the internal threads of the passage 22. As described above, the annular lip 36 preferably rests against the shoulder 23 with the screen 30 and sealing means 29 inserted in passage 22 thereafter. The diverter/screen includes a frustro-conical shaped body 38 having a flattened, circular end or surface 39, formed integrally with or secured to the annular lip 36. This body 38 extends away from the inlet 18, through inlet 24 and into internal chamber 25 a predetermined distance. A plurality of openings or holes 40 are formed in and pass entirely through the sloping side surface of body 38. These holes 40 are preferably of different sizes, with the holes at the top of the screen, adjacent to annular lip 36 being the largest, and the remaining holes along the sloping side surface progressively getting smaller toward flattened end 39 to allow entering fluid to be diverted by the size of the holes, the shape of the body 38 and flattened end 39 so as to flow evenly into and through the filtering media 27. The filtering media substantially fills internal chamber 25, between the interior surface of end wall 19, the exterior surface of the frustro-conical diverter/screen means 31, and the outlet screen 32.

The flattened end 39 of diverter screen 31 may be of any desired size, and either solid to completely deflect or divert water impinging against the inside surface thereof, or may include a plurality of openings 41 passing therethrough. The openings 41 are preferably made smaller than, or are reduced in size in comparison to all of the openings 40 formed in the sloping side wall of body 38 to further aid in control of the flow of fluid into and through the filtering media 27. The direction of this flow of fluid through filter media 27 is shown more clearly by the arrows 42, 43 in FIG. 2.

The dechlorination or filtering media 27 held within the internal chamber 25 may consist of any commercially available filter media, but is preferably a substantially 100% granulated or powdered zinc. This 100% granulated or powdered zinc, may be in a bed of any desired thickness, depending on the specific use of the assembly 10, to dechlorinate fluids, such as water, passing through the chamber, in the manner described above. Furthermore, the use of 100% zinc as a filter media to dechlorinate water to a shower or bath is believed to be unique in that it allows a much greater capacity or volume of water to be passed therethrough, while at the same time allowing water at elevated temperatures to be efficiently dechlorinated. It, therefore, can be seen that this zinc filter media provides both an increased volume and temperature efficiency, in comparison to known organic filtering media. Furthermore, the absence of any copper in this 100% zinc filter media ensures compliance with EPA and other regulations. Furthermore, as pointed out above, the zinc reacts more completely with the chlorine, to thereby produce a more complete dechlorination of water passing therethrough.

A further advantages of using the substantially 100% zinc filter media of the present invention is that it is used independently of electrochemical activators to provide a more efficient oxidation of the chlorine and other unwanted substances in water than the known "electronegative cell potential types", referred to above. Also, the by-product formed when zinc and chlorine react is zinc chloride (ZnCl), an FDA rated "food safe" substance found in food supplements and vitamins, as opposed to the above mentioned problems which occur when copper is present in the filter media.

In use, the unitary filter assembly 10 and zinc filter media of the present invention are used to filter out impurities in any fluid, but are preferably for use to dechlorinate hot water exiting from the end of a waterline 12, for passage to a faucet or the like in a bathtub, or to a shower head in a shower.

The assembly 10 is made of the desired size so as to not take up too much space, and as a one piece or unitary assembly including the inlet 18 and outlet 20 to provide a device which exceeds known safety and strength standards. The filter media 27 is preferably added to or placed in the internal chamber 25, after the housing 16 of assembly 10 is formed and the screen 32 placed and held therein, in a manner known to those skilled in the art, against the vanes 34. The filter media 27 is poured or funneled through the passages 22 and 24 into chamber 25 until it is determined that sufficient filter media has been inserted therein to substantially fill the available space. The diverter/screen 31 is then inserted into the threaded passage 22 by means of the annular lip 36 engaging in the internal threads, in a manner well known to those skilled in the art, as by the use of a screwdriver or special finger grip tool to engage lips or edges (not shown) formed integrally on the interior surface of the diverter/screen 31, to turn the same in a manner known to those skilled in the art, for insertion until the annular lip 36 contacts shoulder 23. The screen 30 and sealing means 29 are then inserted into passage 22 and the entire assembly 10 may be placed in use, as by screwing the same onto the end of the pipe 12. If the filter media is to be replenished or replaced for any reason, the assembly 10 is removed from the pipe 12 and the sealing means 29, the screen 30 and diverter/screen 31, removed from passage 22, by reversing the steps of insertion, just described, and then adding more filter media, as required, or desired.

A further advantage is gained by the removable diverter/screen means 31 of the present invention. This feature adds to the filter assembly's desirability and is felt to be ecologically responsible, in that it conserves resources by the reduced need for petrochemicals and energy to make additional housings. Furthermore, disposal/landfill requirements are reduced because the filter housings will not be discarded after the filter media has been used up.

Accordingly, as will be apparent to those skilled in the art, the present invention provides considerable advantages in ease and flexibility of filtering chlorine or other unwanted substances from fluids such as water, and provides both a unique device and a method for removing chlorine or other substances from water, and preferably from hot water. Specifically, the method disclosed herein more efficiently and safely removes chlorine from water at elevated temperatures without any known adverse health risks.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

I claim:

1. A unitary filter assembly comprising
   a hollow body having an internal chamber formed therein between inlet and outlet means integrally formed with said body to allow the flow of fluid into and out of said chamber;
   said hollow body being cylindrical with a pair of domed end walls having exterior and interior surfaces integrally formed thereto, and a plurality of vanes fixed within said internal chamber to said interior surfaces of said domed end walls for strengthening and fluid flow control purposes;
   a diverter/screen means removably mounted within said inlet means and extending into said internal chamber a predetermined distance from said inlet means;
   said diverter/screen means being captured in position within said inlet means and said internal chamber to control the flow of water from said inlet means into said internal chamber;
   a filter media substantially filling said internal chamber; and
   said diverter/screen means in said inlet means being removable therefrom and from said internal chamber to allow said filter media to be inserted into or removed from said internal chamber.

2. The unitary filter assembly of claim 1, further including an outlet filter screen held within said internal chamber adjacent said outlet means to prevent filter media from exiting therefrom.

3. The unitary filter assembly of claim 2 wherein said outlet means includes screen threads formed externally on the end thereof to allow a device to be secured to the threaded end of said outlet means.

4. The unitary filter assembly of claim 3 wherein said diverter/screen means is frustro-conical in shape with a flattened end in said internal chamber.

5. The unitary filter assembly of claim 4 wherein said diverter/screen means includes an annular lip sized so as to be threadedly captured within said inlet means, and a frustro-conical shaped body with a flattened end and a plurality of openings formed at least in said body, secured to said annular lip and extending into said internal chamber.

6. The unitary filter assembly of claim 5 wherein said hollow body is cylindrical with a pair of domed end walls having exterior and interior surfaces integrally formed thereto, and a plurality of vanes fixed within said internal chamber to said interior surfaces of said domed end walls for strengthening and fluid flow control purposes, and wherein said filter media is substantially 100% zinc held between said outlet screen mounted in said chamber against said vanes on said interior surface of said end wall adjacent said outlet and said diverter/screen means.

7. A unitary filter assembly adapted to remove chlorine from water, including:
   a cylindrical hollow body comprised as a single integral unit having domed end walls with exterior and interior surfaces, and an annular side wall bounding a hollow inner chamber with a filter media held therein;
   water inlet and outlet means formed integrally with said domed end walls and extending outwardly away from said domed end walls and said hollow inner chamber, and fluidly connected to said hollow inner chamber;

a diverter/screen means removably mounted in the water inlet means and extending into said chamber, said diverter/screen means having a plurality of openings formed therein whereby water entering said inlet water inlet means will pass through said openings in said diverter/screen means to be evenly distributed into said filter media within said hollow inner chamber; and a cylindrical outlet filter mounted within said hollow inner chamber adjacent the water outlet means on a plurality of vanes formed on the interior surface of said domed end wall having said water outlet means therein.

8. The unitary filter assembly of claim 7 wherein said filter media in said chamber is 100% zinc in granulated or powdered form.

9. The unitary filter assembly of claim 8 wherein the interior surface of said domed end wall adjacent said inlet includes a plurality of vanes thereon and said diverter/screen means includes an annular lip sized so as to be threadedly captured within said inlet, and a frustro-conical shaped body, having said plurality of openings formed therein, secured to said annular lip and extending into said inner chamber.

10. The unitary filter assembly of claim 9 wherein said outlet includes threads formed on a portion of the exterior thereof; and a device may be mounted on said threaded portion of said outlet.

11. The unitary filter assembly of claim 7 wherein said diverter/screen means includes an annular lip held within said inlet, and a frustro-conical shaped body, having said plurality of openings formed therein, secured to said annular lip and extending into said inner chamber with a flattened end thereon in said chamber, and said annular lip of said diverter/screen is threaded into threads formed in said inlet and said openings formed in said frustro-conical body are larger than openings formed in said flattened end thereof.

* * * * *